US006862269B1

United States Patent
Nasta

(12) United States Patent
(10) Patent No.: US 6,862,269 B1
(45) Date of Patent: Mar. 1, 2005

(54) SATELLITE WITH OMNIDIRECTIONAL COVERAGE

(75) Inventor: Rodolphe Nasta, Toulouse (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/471,281

(22) Filed: Dec. 23, 1999

(30) Foreign Application Priority Data

Dec. 31, 1998 (FR) .......................................... 98 16713

(51) Int. Cl.[7] .............................................. H04Q 7/38
(52) U.S. Cl. ...................... 370/320; 370/324; 455/12.1; 455/13.1; 455/427
(58) Field of Search .................................. 370/320, 324; 455/12.1, 13.1, 427, 561, 562.1, 562, 436; 375/130, 135, 137

(56) References Cited

U.S. PATENT DOCUMENTS

| | | | | | |
|---|---|---|---|---|---|
| 5,923,292 | A | * | 7/1999 | Dodd ......................... | 342/383 |
| 5,970,084 | A | * | 10/1999 | Honda ........................ | 375/147 |
| 6,047,019 | A | * | 4/2000 | Ishii ........................... | 375/206 |
| 6,055,431 | A | * | 4/2000 | Dybdal ....................... | 455/450 |
| 6,061,388 | A | * | 5/2000 | Saulnier ..................... | 375/200 |
| 6,067,019 | A | * | 5/2000 | Scott .......................... | 340/573.4 |
| 6,067,442 | A | * | 5/2000 | Wiedeman et al. ........ | 455/13.1 |
| 6,157,811 | A | * | 12/2000 | Dent .......................... | 455/12.1 |
| 6,192,217 | B1 | * | 2/2001 | Farrell ........................ | 455/13.1 |
| 6,240,149 | B1 | * | 5/2001 | Yukitomo et al. .......... | 375/347 |
| 6,272,345 | B1 | * | 8/2001 | Worger et al. .............. | 455/436 |
| 6,317,452 | B1 | * | 11/2001 | Durrant ...................... | 375/130 |
| 6,327,534 | B1 | * | 12/2001 | Levanon et al. ............ | 701/215 |
| 6,353,643 | B1 | * | 3/2002 | Park ........................... | 375/347 |

FOREIGN PATENT DOCUMENTS

| | | |
|---|---|---|
| EP | 0 639 009 A1 | 2/1995 |
| WO | WO 98/56123 | 12/1998 |

* cited by examiner

*Primary Examiner*—William Trost
*Assistant Examiner*—Brandon J. Miller
(74) *Attorney, Agent, or Firm*—Sughrue Mion, PLLC

(57) ABSTRACT

The invention concerns a satellite having at least two antennas (3, 5) whose radiation patterns overlap, at least in part and means (45; 47, 49, 51) for receiving the sum of the signals from the various antennas. To limit multipath problems when summing signals from the antennas, the invention proposes that the receiver means include means for demodulating a spread spectrum signal and that the absolute difference between the respective transmission times of signals transmitted to the receiver means via two antennas is greater than one chip of the spread spectrum modulation. Application to a satellite TTC (telemetry, tracking and command) link.

16 Claims, 1 Drawing Sheet

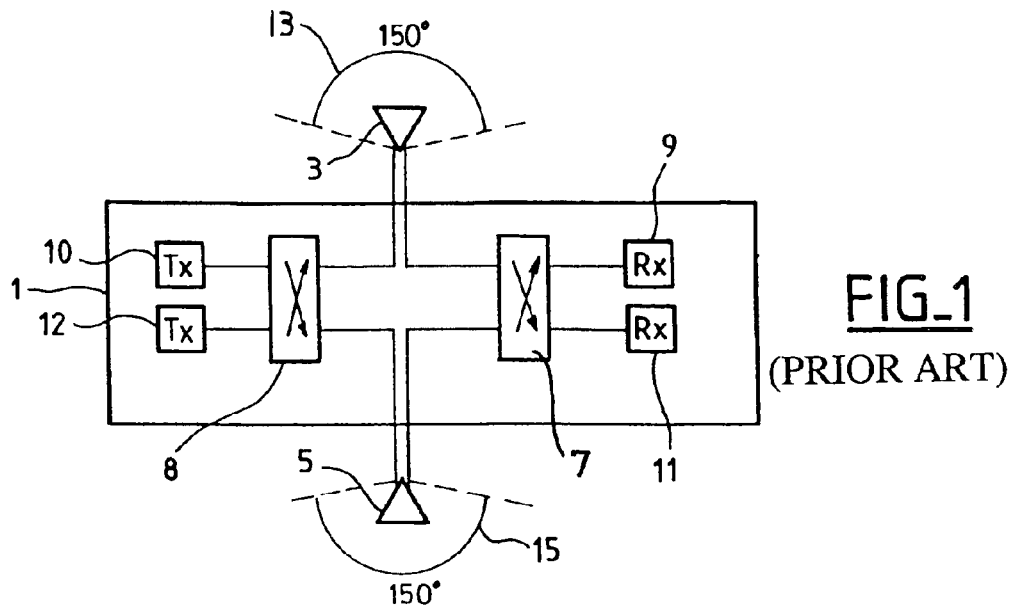
FIG_1 (PRIOR ART)
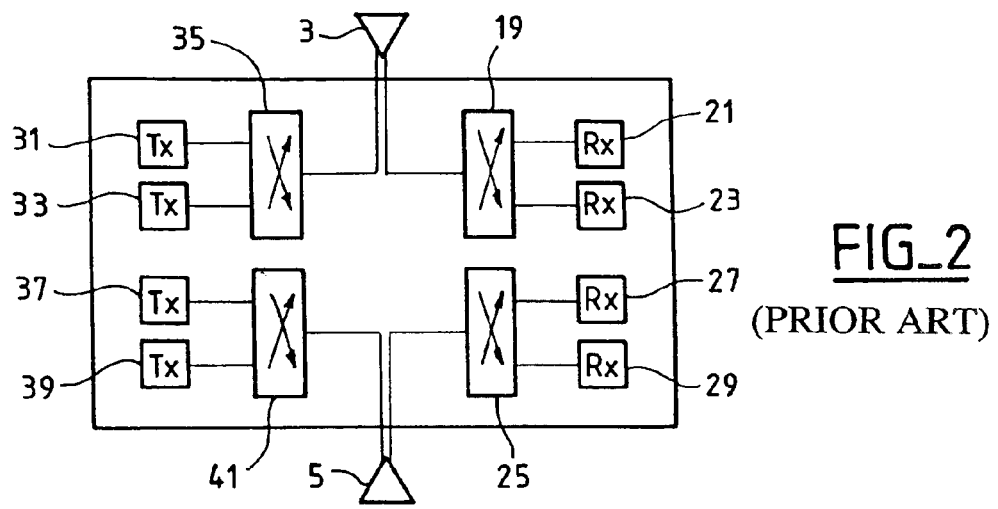
FIG_2 (PRIOR ART)
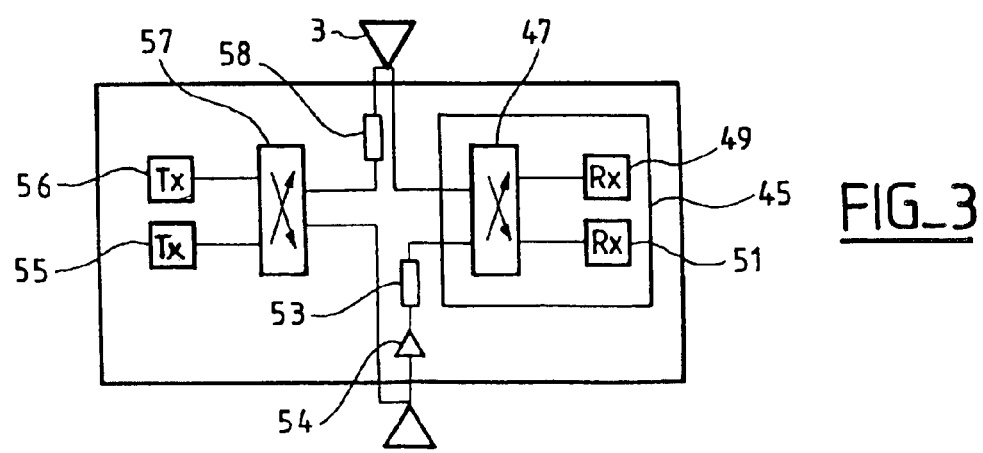
FIG_3

SATELLITE WITH OMNIDIRECTIONAL COVERAGE

The present invention relates to a method of transmitting signals to a satellite having at least two antennas whose radiation patterns overlap, at least in part; it also relates to a method of transmitting signals to and from a satellite of this kind. It further relates to a satellite having at least two antennas whose radiation patterns overlap, at least in part.

The invention relates to satellites, and in particular to the telemetry, tracking and command (TTC) or telemetry, command and ranging (TCR) link between ground stations and a satellite. A link of this kind can be established very reliably during all phases of the life of a satellite; broadly speaking, there are four phases:

- a station acquisition phase, which corresponds to the period from injection into orbit by the launch vehicle to acquisition of the satellite's final position;
- a station-keeping phase, which corresponds to the phase of nominal operation of the satellite;
- a standby phase, if required, which corresponds to a malfunction and during which the altitude of the satellite can be modified; and
- a deactivation or orbital ejection phase, during which the satellite is directed to a "grave yard" orbit.

It is important for the TTC link to be maintained during all these phases; this requires a satellite coverage that is as wide as possible, in particular for the critical standby, station acquisition and orbital ejection phases.

FIG. 1 is a diagrammatic representation of a prior art satellite; the satellite 1 has an omnidirectional antenna 3 referred to as the Earth antenna and an omnidirectional antenna 5, on the other side of the satellite, referred to as the anti-Earth antenna. These two antennas are connected to a coupler 7 which adds the signals from the antennas and transmits the sum of the signals to one or the other of two receivers (Rx;) 9 and 11; two receivers are provided in a hot redundancy configuration to enable the satellite to continue operating should one of the receivers cease to operate. Summing the signals from the two antennas provides coverage on the Earth and anti-Earth faces of the satellite. That type of system has the following drawbacks. In the area where the radiation patterns of the antennas overlap, the signals received by the satellite via the Earth and anti-Earth antennas are added; the resulting multipath phenomenon interferes with reception of the signal. A symmetrical problem occurs with the telemetry, i.e. for the transmission of signals from the satellite: there are then two transmitters (Tx) 10 and 12 in a cold redundancy configuration and a coupler 8; the signals supplied by the active transmitter are transmitted via the Earth and anti-Earth antennas. Although this is not shown in the figure, there can be separate transmit and receive antennas.

This is why, on conventional platforms, the guaranteed coverages for each antenna are limited to a cone of visibility which typically has an aperture of ±75° C. FIG. 1 is a diagram which shows the corresponding cones of visibility 13 and 15 of the antennas 3 and 5, which have an angle at the center of 150°. These values are given by way of example, but in any event the coverages are necessarily limited. Coverage is not guaranteed outside this cone, i.e. in the area of overlap of the radiation patterns of the antennas. This solution is not satisfactory because it does not guarantee coverage for critical phases such as the standby and station acquisition phases.

Various solutions to this problem have been proposed. ESA or CNES programs propose the use of crossed circular polarizations for the Earth and anti-Earth antennas. One polarization, for example right circular polarization, is used for the Earth antenna and the cross polarization, i.e. left circular polarization in this case, is used for the anti-Earth antenna. The operation of the satellite is similar to that described with reference to FIG. 1 outside the area of overlap of the antenna radiation patterns, except that the ground stations must transmit a wave whose polarization depends on the position of the satellite. In the antenna overlap area, and for a circularly polarized incident wave, polarization isolation limits the multipath effect on the recombination of signals from the two antennas. It is possible to obtain satisfactory coverage in the antenna overlap area for a polarization isolation in the order of 10 dB. Once again, the solution is symmetrical for the telemetry.

That solution has the drawback of generating a small loss in link budget; above all, it requires a circularly polarized incident wave, which is not possible with some Ku band stations, for example, such as those of the linearly polarized TELESAT work; also, it is difficult to determine the position of the satellite in order to be able to choose the appropriate polarization, especially in standby modes.

FIG. 2 shows another prior art satellite. The satellite of FIG. 2 is identical to that of FIG. 1 except that it does not include any coupler 7 or receivers 9 and 11 receiving the signals from the two antennas, but instead a coupler 19 and two receivers 21 and 23 in a hot redundancy configuration for the Earth antenna 3 and a coupler 25 and two receivers 27 and 29 in a hot redundancy configuration for the anti-Earth antenna. Hot redundancy is used for the receivers 21 and 23, on the one hand, and the receivers 27 and 29, on the other hand, so that the summation problem, and therefore the multipath problem, does not arise in the case of the signals received via the Earth and anti-Earth antennas. It is nevertheless necessary to select the signal used, which can be either that from the Earth antenna or that from the anti-Earth antenna.

For telemetry, the Earth antenna uses two transmitters 31 and 33 operating at a first frequency with a coupler 35, and the anti-Earth antenna uses two transmitters 37 and 39 operating at a second frequency with a coupler 41. The two transmitters on each channel are in a cold redundancy configuration. Transmitting at different frequencies limits the multipath problem in the area of overlap of the Earth and anti-Earth antennas.

That solution has the drawback of doubling the number of receivers; also, it makes the logic for choosing between the Earth and anti-Earth antennas more complex. The number of transmitters required for telemetry is also doubled; furthermore, it is still necessary to determine the position of the satellite in order to choose the appropriate frequency.

U.S. Pat. No. 3,761,813 describes a geostationary satellite transmission system for aircraft. It refers to the multipath problem caused by reflections from the ground of signals transmitted by the satellite. The solution proposed is to multiplex the signals transmitted to the various aircraft in time division; the period of the multiplex is chosen so that the signals reflected from the surface of the Earth do not reach an aircraft at the same time as the signals intended for it. Using different frequencies for the various channels of the time-division multiplex is also proposed.

U.S. Pat. No. 5,450,448 describes a satellite positioning system and proposes a solution to the multipath problem. It proposes processing based on calculating the differences between time-shifted signals to reduce multipath interference. It refers to other prior art solutions to the problem of reducing multipath interference.

Spread spectrum techniques, which are well-known in the art, define a plurality of logical channels on a single physical channel, corresponding to a given carrier frequency and a given bandwidth. The best known are:

direct sequence spread spectrum, which includes code division multiple access (CDMA);

frequency hopping (FH), which also includes CDMA;

carrier sense multiple access (CSMA).

In spread spectrum systems, the term "bit" refers to the binary information transmitted on a channel and the term "chip" refers to the binary information associated with a pseudo-random sequence.

In the case of multiple access, as enabled by spectrum spreading sequences, a plurality of users can communicate simultaneously on different logical channels on the same physical channel. These techniques use pseudo-random codes which are usually referred to as pseudo-noise (PN). The PN codes are chosen on the basis of criteria associated with their auto-correlation and crosscorrelation functions, so that a receiver decodes only the signal intended for it, possibly with an interference signal, depending on the number of users and the properties of the codes.

There is a choice between:

orthogonal code families, for example Hadamard codes or Walsh codes; in this case a code which is orthogonal to all the others is used for each logical channel;

limited crosscorrelation function codes, for example Gold codes; the level of the interference signal mentioned above then depends on the codes adopted and their length;

the same code for all users, for example in the case of the maximum length code family; each transmitter must use a specific phase of the code, different from the other phases used. The auto-correlation properties of the code are therefore used in this case to detect a correlation peak when the codes overlap, there being minimum correlation in other circumstances.

For more details of these techniques, see "Coherent Spread Spectrum Systems" by J. H. Holmes or "Wireless Digital Communications (Modulation and Spread Spectrum Applications)" by Kamilo Feher.

The invention proposes a solution to the problem of the antenna coverage of satellites achieving complete satellite antenna coverage without duplicating transmitters or receivers.

To be more precise, the invention proposes a method of transmitting signals to a satellite having at least two antennas whose radiation patterns overlap, at least in part and means for receiving signals from the various antennas, the method including the following steps:

transmitting spread spectrum modulated signals, receiving the signals via the antennas, summing the signals received via the antennas and delaying at least one of the received signals so that the path difference between the summed signals is at least one chip of the spread spectrum modulation, and demodulating the summed signals.

It also proposes a method of transmitting signals from a satellite having at least two antennas whose radiation patterns overlap, at least in part and means for sending signals to the various antennas, the method including the following steps:

spread spectrum modulating the signals to be transmitted, sending the modulated signals to the antennas, and transmitting the signals via the antennas, the signals transmitted via the antennas being offset by at least one chip of the spread spectrum modulation.

In this case, the modulation step includes modulating the signals intended for said antennas using spreading sequences offset by at least one chip.

The sending step advantageously includes applying a time-delay to the signals intended for at least one of the antennas.

The invention further proposes a method of transmitting signals from a satellite having at least two antennas whose radiation patterns overlap, at least in part and means for sending signals to the various antennas, the method including the following steps:

spread spectrum modulating the signals to be transmitted, sending the modulated signals to the antennas, and transmitting the signals via the antennas, the signals intended for the various antennas being spread spectrum modulated using different sequences.

The invention additionally proposes a satellite having at least two antennas whose radiation patterns overlap, at least in part and means for receiving the sum of the signals from the various antennas, the satellite being characterized in that the receiver means include means for demodulating a spread spectrum signal and in that the absolute difference between the respective transmission times of signals transmitted to the receiver means via two antennas is greater than one chip of the spread spectrum modulation.

The receiver means advantageously include a coupler for signals from the antennas and at least two receivers connected to the coupler.

The satellite preferably includes time-delay units between at least one antenna and the receiver means.

The time-delay units advantageously include a coaxial connection, a delay line or a surface acoustic wave filter.

The invention also proposes a satellite having at least two antennas whose radiation patterns overlap, at least in part and means for sending signals to the antennas, characterized in that the sending means include means for spread spectrum modulating the signal to be transmitted and in that the absolute difference between the respective transmission times of signals transmitted by the transmitter means via two antennas is greater than one chip of the spread spectrum modulation.

The invention finally proposes a satellite having at least two antennas whose radiation patterns overlap, at least in part and means for sending signals to the various antennas, the satellite being characterized in that the sending means include means for spread spectrum modulating the signals intended for the various antennas using different sequences.

The transmitter means preferably include at least two transmitters in a cold redundancy configuration and a coupler for sending the signals from the transmitters to the antennas.

In one embodiment of the invention the satellite includes time-delay units between the transmitter means and at least one antenna.

The time-delay units can include a coaxial connection, a delay line or a surface acoustic wave filter.

Other features and advantages of the invention will become apparent on reading the following description of embodiments of the invention, which is given by way of example and with reference to the accompanying drawing, in which:

FIG. 1 is a diagram of a prior art satellite,

FIG. 2 is a diagram of another prior art satellite, and

FIG. 3 is a diagram of a satellite embodying the invention.

The invention proposes to use spread spectrum modulation to assure antenna coverage in the overlap areas of the radiation patterns of the antennas and to dispose or to connect the antennas so that the difference between the transmission times of signals via two antennas is greater than one chip of the spread spectrum modulation. It applies equally to reception and to transmission and avoids or at least limits multipath problems.

In another embodiment of the invention, and in particular in the case of telemetry, to limit or avoid problems in the area of overlap of the antennas the invention proposes to use different spreading sequences for the different antennas.

On reception, if the receiver means lock onto a signal transmitted by one antenna, they ignore signals transmitted by another antenna, because those signals are offset by more than one chip or spread using another sequence.

On transmission, the signals transmitted in the antenna overlap area are offset sufficiently not to interfere with each other much or at all.

FIG. 3 shows a satellite in accordance with the invention. Like the prior art satellite, the satellite from FIG. 3 includes an omnidirectional Earth antenna 3 and an omnidirectional anti-Earth antenna 5 disposed back-to-back on respective opposite sides of the satellite. The two antennas are connected to receiver means 45. The receiver means can include a coupler 47 for summing the signals from the antennas and transmitting the summed signals to one or the other of two receivers 49 and 51 in a cold redundancy configuration. The receivers include means for demodulating a direct sequence spread spectrum signal.

According to the invention, the antennas and receiver means are disposed so that the difference between the transmission times of signals received from the ground station via the two antennas is greater than one chip of the spread spectrum modulation. There are various ways to achieve this. On the one hand, allowance can be made for the length of the connection between the antennas and the receivers (respectively the transmitters) on respective opposite sides of the satellite; this length can in itself induce a difference between the Earth and anti-Earth paths; this difference can be greater than one chip and in itself assure a sufficient difference between the transmission times. Accordingly, an antenna path difference of 4 m or 5 m, which leads to a corresponding Earth and anti-Earth path difference, is sufficient for a code at 60 megachips/second. The difference between the path times is then in the order of 1 chip or 1.25 chips.

Time-delay units may be provided between one or other of the antennas and receiver means to assure a sufficient path difference in all possible positions of the satellite relative to the transmitter; the time-delay units can include an additional length of coaxial connection 53 or active or passive time-delay components such as delay lines or surface acoustic wave filters. Using the latter components can then make it necessary to change frequencies before summing the signals from the antennas. If necessary, a low-noise amplifier 54 can also be provided on the input side of the time-delay units. Inserting time-delay units between at least one of the antennas and the receiver means increases the Earth and anti-Earth path difference; a slower chip rate can then be used. Accordingly, inserting a 100 ns time-delay unit substantially eliminates multipath phenomena with a spread spectrum signal of more than 10 Mchip/s.

There follows an example of calculation in the case of maximum length codes. For these codes, the auto-correlation function has a peak when the codes overlap and there is an auto-correlation minimum when the codes do not overlap.

The data is multiplied by a PN code on transmission by the ground station; multiplication by a synchronous PN code restores the data on reception. Means known in the art are used on reception to lock onto a received signal.

The signal received by the satellite is a signal modulated by D(t).PN(t); D(t) is the data sequence to be transmitted, with the value ±1, for example, and PN(t) is the code sequence, which also takes the values ±1. For binary phase shift keying (BPSK), for example, the signal is proportional to:

$$D(t).PN(t).\cos(\omega_0.t+\theta_0)$$

where $\omega_0$ is the angular frequency of the carrier. Note the path differences between the Earth antenna and the receiver means, on the one hand, and between the anti-Earth antenna and the receiver means, on the other hand, in the area of overlap of the radiation patterns of the antennas $T_2$ and $T_2$. For explanatory purposes, it is assumed that the Earth and anti-Earth antennas receive the signals at the same time. The signal received by the receiver means via the Earth antenna is proportional to:

$$D(t-T_1).PN(t-T_1).\cos(\omega_0.(t-T_1)+\theta_0)$$

The signal received by the receiver means via the anti-Earth antenna is proportional to:

$$D(t-T_2).PN(t-T_2).\cos(\omega_0.(t-T_2)+\theta_0)$$

The receiver means receive the sum of the two signals and seek to lock onto one or the other. If the signals are of comparable power, the receiver can lock onto either signal. Assuming that the receiver means lock onto the Earth signal, after demodulation and multiplication by the $PN(t-T_1)$ code, the following signal S(t) is obtained:

$$S(t) = [D(t - T_1) \cdot PN(t - T_1) + D(t - T_2) \cdot PN(t - T_2)] \cdot PN(t - T_1)$$
$$= D(t - T_1) + D(t - T_2) \cdot PN(t - T_2) \cdot PN(t - T_1)$$

If the time $|T_2-T_1|$ is greater than the duration of a chip of the pseudo-random noise sequence PN, and because of the auto-correlation properties of the sequence, the result after integration over the duration of a symbol is:

$$S(t)=D(t-T_1)+I_0$$

where $I_0$ is a bounded term which can be minimized by a judicious choice of the code and chip rate.

The transmitted signal is therefore obtained at the output of the receiver means and after demodulation of the spread spectrum signal without the summing of the signals from the antennas causing multipath problems. It is therefore possible to continue to use a single receiver, or two receivers in a hot redundancy configuration, and to receive signals correctly in the area of overlap of the antenna radiation patterns. Compared to conventional use of the spread spectrum technique to transmit different channels, the invention also uses spectrum spreading to transmit the same signal; this avoids or limits multipath problems and problems relating to the overlap of the receive radiation patterns of the antennas.

The invention has been described in detail for reception. It also applied to transmission by the satellite, in accordance with the same principles. There are then two transmitters 55 and 56 in a cold redundancy configuration, for example, which supply a direct sequence spread spectrum signal; a coupler 57 feeds the signal supplied by one transmitter to both antennas. Time-delay units 58 between the coupler and one of the antennas make the difference between the Earth path and the anti-Earth path greater than one chip, regardless of the position of the ground receiver station in the area of overlap of the transmit radiation patterns of the antennas.

In this case, the Earth station receiving the signals receives signals which are offset by more than one chip of the spread spectrum modulation if it is in the area of overlap of the two antennas of the satellite. The ground station therefore locks onto one signal and ignores the other one.

Other solutions are possible. Thus instead of delaying one of the signals after spectrum spreading, as explained above, the signals intended for the antennas could be spread in two separate spreading devices. Each spreading device could use the same PN code, the code of one of the devices being offset relative to the code of the other device.

Different codes could also be used in each spreading device; in this case, the signals transmitted by the two antennas would be spread with orthogonal codes or codes having a limited crosscorrelation function. If it were in the area of overlap of the antennas, the receiver could lock onto the signal from one of the antennas without the signal from the other antenna causing any reception problems.

In all cases, the same signals are transmitted by the antennas, either with an offset greater than one chip of the spread spectrum modulation or with different spreading sequences. This avoids or at least limits reception problems in the area of overlap of the radiation patterns of the antennas.

For reception, as for transmission, phase differences between the signals do not degrade the quality of reception in the area of overlap of the radiation patterns of the antennas; note that the invention enables the use of a single receiver which receives the sum of the signals from the antennas without it being necessary to select the receive signal. Thus if the satellite locks onto the anti-Earth signal in the area of overlap of the radiation patterns of the antennas, and the power of that signal falls because the satellite is presenting the Earth antenna to the transmitter station, the receiver means lose the anti-Earth signal onto which they are locked and then lock onto the Earth signal. This occurs without it being necessary to make specific provision for it. The invention therefore enables reception or transmission in all phases, without needing to know the position of the satellite.

Of course, the present invention is not limited to the embodiments shown and described and is open to many variants that will be evident to the skilled person. Thus the invention has been described with reference to the figures in the simplest case of two antennas, an Earth antenna and an anti-Earth antenna. It also applies in the case of multiple antennas which have radiation patterns which overlap in pairs, in groups of three or more, or all at once. In a configuration of this kind, it is sufficient to assure that the path difference between two signals received in the area of overlap is greater than one chip. Also, the invention has been described for BPSK modulation; it applies to any other type of modulation.

It applies not only to the direct sequence spreading technique described by way of example but also to other spectrum spreading techniques.

Because of the importance of maintaining the link, the invention is particularly advantageous when used on the TTC or TRC link of a satellite. It can also be applied to links of any other type.

In the description, the offset between the signals from the antennas is at least one chip. In fact, it depends on the spreading used and can be greater than this value, depending on the auto-correlation of the spreading sequence used or the crosscorrelation between sequences.

What is claimed is:

1. A method of transmitting signals to a satellite having at least two antennas whose radiation patterns overlap, at least in part, and means for receiving the signals, the method comprising the following steps:
    transmitting the signals as spread spectrum modulated signals;
    receiving the signals via the at least two antennas;
    summing the signals received via the at least two antennas and delaying at least one of the signals received via the at least two antennas so that a path difference between the summed signals is at least one chip of the spread spectrum modulation; and
    demodulating the summed signals.

2. A method of transmitting signals from a satellite having at least two antennas whose radiation patterns overlap, at least in part, and means for sending the signals, the method comprising:
    spread spectrum modulating the signals to be transmitted;
    sending the spread spectrum modulated signals to the at least two antennas; and
    transmitting the spread spectrum modulated signals via the at least two antennas, the spread spectrum modulated signals transmitted via the at least two antennas being offset by at least one chip of the spread spectrum modulation.

3. The method according to claim 2, wherein the spread spectrum modulating step comprises modulating the signals to be transmitted via said at least two antennas using spreading sequences offset by at least one chip.

4. The method according to claim 2 or claim 3, wherein the sending step comprises applying a time-delay to the signals intended for at least one of the at least two antennas.

5. A method of transmitting signals from a satellite having at least two antennas whose radiation patterns overlap, at least in part, and means for sending signals, the method comprising the following steps:
    spread spectrum modulating the signals to be transmitted;
    sending the modulated signals to the at least two antennas; and
    transmitting the signals via the at least two antennas, the signals transmitted via the at least two antennas being spread spectrum modulated using different sequences.

6. A satellite comprising:
    at least two antennas whose radiation patterns overlap, at least in part,
    receiver means for receiving the sum of signals received by the at least two antennas,
    wherein the receiver means comprise means for demodulating a spread spectrum signal, and
    the absolute difference between respective transmission times of the signals received by the receiver means via the at least two antennas is greater than one chip of a spread spectrum modulation.

7. The satellite according to claim 6, wherein the receiver means further comprise a coupler for signals from the antennas and at least two receivers connected to the coupler.

8. The satellite according to claim 6 or claim 7, further comprising time-delay units between at least one antenna of the at least two antennas and the receiver means.

9. The satellite according to claim 8, wherein the time-delay units comprise at least one of a coaxial connection, a delay line or a surface acoustic wave filter.

10. A satellite comprising:
    at least two antennas whose radiation patterns overlap, at least in part, and transmitter means for transmitting signals via the at least two antennas, wherein the transmitting means comprise means for spread spectrum modulating the signals, and an absolute difference between respective transmission times of the signals transmitted by the transmitter means via the at least two antennas is greater than one chip of the spread spectrum modulation.

11. A satellite comprising:

at least two antennas whose radiation patterns overlap, at least in part, and transmitter means for sending signals to the various at least two antennas, wherein the transmitter means comprise means for spread spectrum modulating the signals intended for transmission via the at least two antennas using different sequences.

12. The satellite according to claim 10 or claim 11, wherein the transmitter means comprise:

at least two transmitters in a cold redundancy configuration; and a coupler for sending the signals from the transmitters to the at least two antennas.

13. The satellite according to claim 10 or claim 11, further comprising time-delay units between the transmitter means and at least one antenna of the at least two antennas.

14. The satellite according to claim 13, wherein the time-delay units comprise at least one of a coaxial connection, a delay line or a surface acoustic wave filter.

15. The method according to claim 1 or claim 2 which excludes phase shifting of the signals.

16. The satellite according to claim 10 or claim 11 which is free of means for phase shifting the signals.

* * * * *